United States Patent

[11] 3,617,678

[72] Inventor Sam Larkin
254 Beach 140th St., Belle Harbor, N.Y.
[21] Appl. No 848,942
[22] Filed Aug. 11, 1969
[45] Patented Nov. 2, 1971

[54] ELECTRODE-MOVING AND PRESSURE-APPLYING MECHANISM OF WELDING APPARATUS IN AUTOMATIC MACHINERY AS FOR MAKING WIRE MESH OR THE LIKE
5 Claims, 7 Drawing Figs.

[52] U.S. Cl. ................................. 219/56, 219/86
[51] Int. Cl. .................................. B23k 11/10
[50] Field of Search ...................... 219/89 56 78, 86, 74/54

[56] References Cited
UNITED STATES PATENTS
2,850,619  9/1958  De Lucia ........ 219/89
2,860,231  11/1958  Stone ............. 219/89 X
3,405,743  10/1968  Robinson ....... 219/56 X Primary Examiner—J. V Truhe
Assistant Examiner—J. G. Smith
Attorney—Friedman & Goodman ABSTRACT: Serving in the welding apparatus in an automatic wire mesh making machine, for each of the longitudinal wires, meaning those arranged in the manner of warp, there is a fixed electrode, and a movable electrode which is at one end of a swingably mounted lever carrying an actuated air cylinder at the other end, whose piston rod is the follower of a cam, said lever being biased to keep the electrodes apart, and said cam guiding its associated longitudinal wire Air under uniform pressure is fed to all the cylinders, or if needed, the pressure may be different in selected cylinders respectively, or two different sources offering air at different pressures are alternately fed the cylinders by automatic valve means whereby initially a relatively high pressure is applied to crush any rust on the work, and then for the greater part of the duration of the welding operation, a comparatively low but proper operational pressure is applied All components as necessary, are adjustable in position, so the spacing of the longitudinal wires can be changed, and there also is a means for extent of finished work movement adjustment to change the distance between transverse wires, so the machine can be accommodated for the making of different size mesh

PATENTED NOV 2 1971

INVENTOR,
Sam Larkin,
by
ATTORNEY

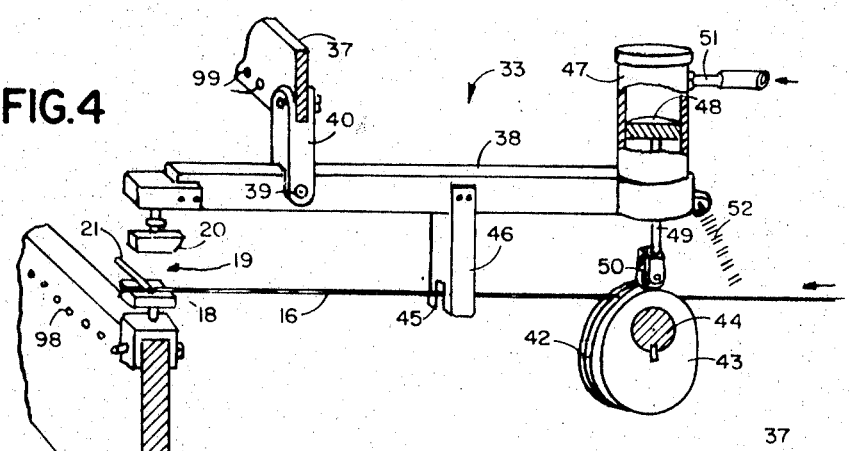
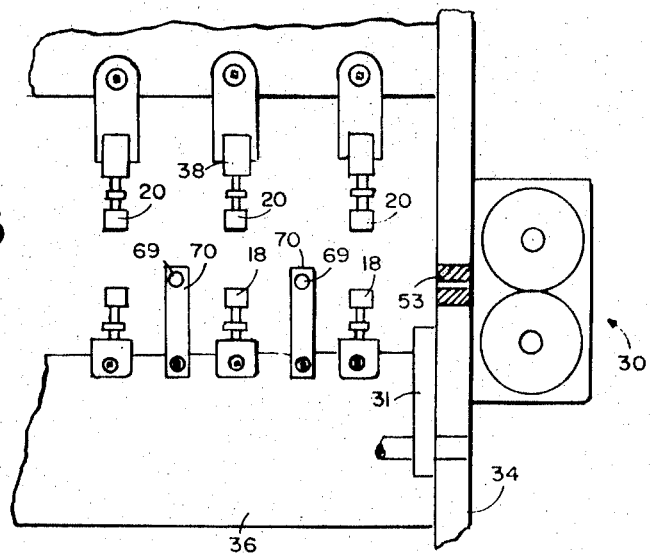
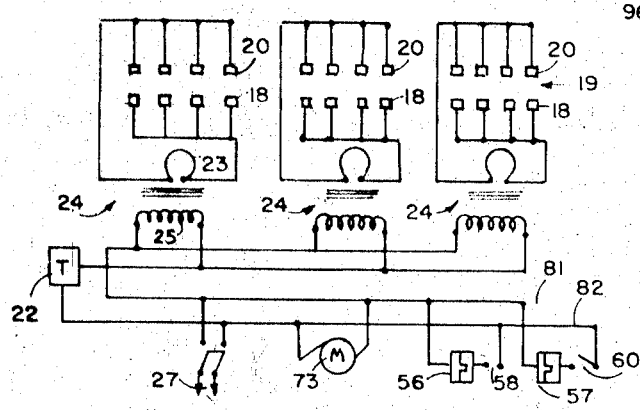

ELECTRODE-MOVING AND PRESSURE-APPLYING MECHANISM OF WELDING APPARATUS IN AUTOMATIC MACHINERY AS FOR MAKING WIRE MESH OR THE LIKE

This invention relates to welding apparatus suitable for example in automatic machinery for making wire mesh in which the transverse wires are laid in spaced relation across a series of spaced longitudinal wires arranged as warp, and then welded thereto. Such mesh, for instance, when made of relatively heavy wires, is adapted to be incorporated in concrete structures to be imbedded therein.

In this type of machinery, each longitudinal wire from off its own supply reel, lies on a fixed welding electrode which is in its path at welding station, and there are cooperating movable electrodes associated with means to shift them to contact and clamp a transverse wire laid on and across the longitudinal wires at welding station, whereupon for a predetermined interval, current is supplied to the electric welding equipment, and thus cause the wires to be welded where they cross. After each welding operation, while the movable electrodes are returned to their normal raised position, the finished work is shifted a predetermined distance, thus feeding the longitudinal wires, and a new transverse wire is laid across the longitudinal wires at welding station for repetition of the cycle of operation, and is repeated for as long as the wire supply lasts.

More particularly, this invention is concerned with, and its principal object is to provide a novel and improved mechanism to shift the movable electrodes, and to apply suitable pressure on the work at the welding station.

Heretofore, each movable electrode in electric welding apparatus was resiliently mounted by a spring means. Upon bringing the said electrode to contact the work and press against it, the pressure imposed on the work continuously increases during a welding operation because of the continuous increase of stress occurring in the spring means. Hence there is an objectionable spreading of the softened metal at fusion region, which too often is the cause of a defective juncture.

It is therefore another object of this invention to provide novel and improved welding apparatus of the character described, in which the pressure imposed on the work is uniform from soon after commencement of the imposition of pressure and thereafter throughout the welding operation.

Heretofore, if the parts to be welded were rusty, too many joints were defective, because of the inability to effect good contact, or any conductive contact.

It is therefore another object of this invention to provide a novel and improved welding apparatus of the kind mentioned, in which at the very commencement of imposition of pressure on the work, the pressure will be relatively high so as to break up the rust, and that then, automatically, the pressure will be lowered to be of constant and of proper operating intensity.

Another object thereof is to provide a novel and improved separate mechanism for each movable electrode, affording adjustment of the pressure which will be exerted on the work at welding station, individually or jointly.

Another object thereof is to provide that such separate mechanism shall afford the facility in machines of this general class, to arrange the machine to make products, as wire mesh or similar assemblies, the spacing of whose longitudinal wires is adjustable.

Another object thereof is to provide a novel and improved mechanism to shift the movable electrodes and apply pressure on the work as is necessary at welding station for the welding operation, using pneumatic means, but whose operation avoids impact action hammer blows.

Still a further object of this invention is to provide novel and improved electric welding mechanism of the character described, having the mentioned attributes, and which is simple in construction, reasonable in cost to make, easy to manipulate, and efficient in carrying out the purposes for which it is designed.

Other objects and advantages will become apparent as this disclosure proceeds.

For one practice of this invention, in the welding apparatus in an automatic machine for making wire mesh, each movable electrode is at one end of its own lever which is swingably mounted. An actuated pneumatic cylinder is carried on the other end of each lever respectively. Each lever is spring-biased to bring its electrode-carrying end upwards away from the associated lower electrode. Each piston rod is a follower against its own cam. Each cam has a peripheral channel which serves as a guide for a particular longitudinal wire. All cams are adjustable in position along a rotating common shaft. Other components are adjustable in position along a common beam, so the spacing between the longitudinal wires which are arranged as warp on the machine, can be changed. One source offers air supply at a uniform pressure to all the cylinders. Where a high initial pressure is desired for rust-busting, followed by a uniform lower operating pressure during each welding operation, an automatic valve means is operated from the cam shaft to alternately feed compressed air from two sources in proper timed relation.

In the accompanying drawings forming part of this specification, similar characters of reference indicate corresponding parts in all the views.

FIG. 4 is a perspective view showing the unit of the welding apparatus made in accordance with teachings of this invention.

FIG. 5 is a fragmentary enlarged end view as seen from the left in FIG. 1.

FIG. 6 is an electrical wiring diagram of the system used to control the operation of the machine including its welding apparatus, in the embodiment illustrated.

FIG. 7 is an electrical wiring diagram of the system used to change the air supply to the cylinders from one of a comparatively high pressure to one of low pressure during each welding operation, in the embodiment illustrated.

Figure 2:
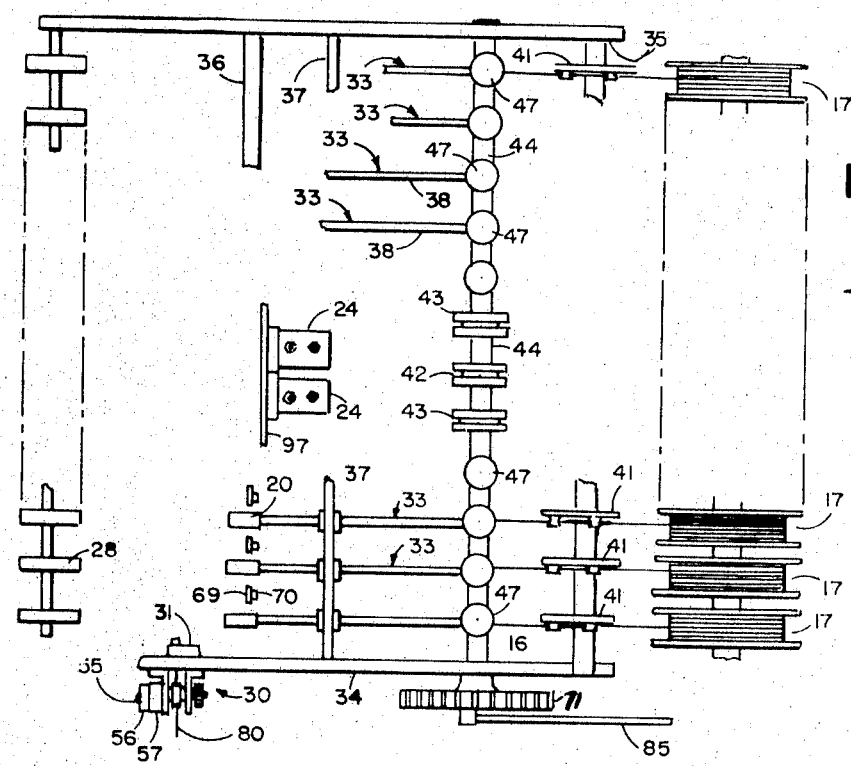
FIG. 2 is a fragmentary top plan view of FIG. 1, including some of the parts omitted in FIG. 1.

In the drawings, the numeral 15 designates generally an automatic wire mesh making machine of the type wherein each of the longitudinal wires 16, arranged in the manner of warp, coming from off its own supply reel 17, lies on a fixed welding electrode 18 which is in its path at welding station 19. For each fixed electrode, there is a cooperating movable electrode 20 which is to be moved to contact and clamp a transverse wire 21, supplied and laid by a suitable means, on and across all the longitudinal wires 16 at welding station, whereupon for a predetermined interval which may be controlled by a timer 22, current is supplied associated electrodes 18 and 20 from the secondary winding 23 of a stepdown transformer 24, whose primary winding 25 is powered by an AC source 27, thus causing the wires to be welded where they cross. After each such welding operation, while the movable electrodes 20 are returned to their normal raised position, the finished work is shifted a predetermined distance by the timely operated nipping rollers 28, 29, thus feeding the longitudinal wires 16, and a new transverse wire is laid across them at welding station for repetition of the cycle of operation, again and again, for as long as the wire supply lasts.

It is to be especially noted that important teachings of the present invention are embodied in the unit of apparatus shown in FIG. 4, which is for the accomplishment of electrode moving and pressure applying onto the work at welding station. I have chosen the specific machine 15, merely to show an illustrative use of this invention. Reference will be made to the machine and its components in a most general fashion, just to indicate their function in conjunction with apparatus of this invention. The specific machine shown, includes the manufacture of the transverse wires by feeding a wire from off a supply reel 80 by nipping feed rollers as 30, and cut to size by a suitable rotary cutter 31, and transported one at a time by a means suggested generally by the numeral 32, to proper position at welding station, all in proper timed relation with the operation of the units of apparatus 33, one of which is shown in FIG. 4. The present invention contemplates also its employment in machines of this type, where a quantity of transverse wires are brought already cut to size from a source outside the machine, and loaded in the machine to be timely laid in succession at welding station across the longitudinal wires by automatic or manual means, all of which is preparatory for the welding operation and the functioning of the apparatus of FIG. 4 of this invention, or required to accomplish wire and work feed after each welding operation.

For each longitudinal wire 16, the machine has a unit 33, for the support of which, the side frames 34, 35 of said machine 15, are spanned by the beams 36 and 37; the region of the beam 36 being at the welding station 19. A description of one such unit will suffice for all of them. The stationary electrode 18 is mounted on the crossbeam 36, to support a longitudinal wire 16 thereon. The numeral 38 designates an elongated lever above and along the path of said wire, pivotally mounted intermediate its ends at 39, which is an axis pin carried at the lower end of a hanger element 40 which is mounted on the cross beam 37; said lever 38, extending from over the stationary electrode 18, to near the wire straightener 41, which first receives said wire from its supply reel 17, whence said wire 16 is guided by lying in the annular channel 42 in the cam 43 which is secured to the shaft 44, and preferably further guided in the slot 45 which is across the lower end of an arm 46, depending from said lever. The end of said lever which is at welding station, carries the electrode 20 for cooperation with the electrode 18, on the work. The other end of said lever which is over the said cam 43, carries an upright pneumatic cylinder 47, whose piston is indicated at 48. The piston rod 49 terminates in a roller 50, which is a follower contacting the periphery of the cam 43. The intake port 51 at the upper end of said cylinder, is for the admission of a controlled supply of compressed air. The numeral 52 denotes a tension coil spring, biasing the cylinder end of the lever 38, downwards. The arrangement is such, that normally, for the cam position shown in FIG. 4, the electrode 20, which evidently serves as the movable electrode, is above and spaced from the stationary electrode 18.

The pinch rollers 30 which feed the transverse wire stock, first through the hardened steel bushing 53 and then into the temporary housing 54, which is in the nature of a spring clamp across the machine 15, are driven by a shaft 55 in which is interposed a normally open electromagnetic clutch 56. An electromagnetic brake 57 is arranged to control said shaft 55. Operation of said clutch is controlled by a normally open microswitch 58, which is operated by a cam 59. Operation of said brake is controlled by a microswitch 60 which is operated by a cam 61. Said cams 59 and 61 are adjustably fixed on a shaft 62. The arrangement as to said clutch and brake is such that when one is actuated, the other is inactive.

The numeral 63 denotes a shaft carrying the laterally extending blade 31 which cooperates with said bushing 53 to cut the transverse wire 21 to proper length. The numeral 64 denotes a shaft carrying a wheel 66, to drive the pitman 67 for oscillating the swingably mounted ejector 68 of the device 32, to shift the transverse wire from the housing 54, onto the longitudinal wires 16 at welding station 19; the proper positioning of said wire 21 being aided by permanent magnets 69 on the posts 70, positioned between pairs of fixed electrodes 18.

The numeral 71 designates a gear on the shaft 44, engaging a much smaller gear 72 for speed reduction; said smaller gear being driven by an electric motor 73, preferably equipped with a speed adjustment means. The shafts 62, 63, 64, 44, 55 and the shaft of said gear 72, are all driven by suitable chain, chain and gear, counter shaft, or other suitable power transmission means driven by said motor, none of such drives being shown, but well known in the machine art. The arrangement of speeds being such that all shafts except 55, shall have the same speed in revolutions per unit of time, but said shaft 55 of the transverse wire feed device 30, shall have a speed in the interval it is rotated during each revolution of the others, that from the transverse wire supply 80, a complete length for a transverse wire is fed across the machine.

In the wiring diagram of FIG. 6, the machine 15 is deemed to include 12 units 33; there being one transformer 24, for each four such units. All movable electrodes 20, are shown in groups of four in one horizontal lane in said diagram, while all fixed electrodes 18 are similarly shown in one lower horizontal lane. All four movable electrodes of each group respectively, are connected to one terminal of the secondary winding 23 of the related transformer 24. All four stationary electrodes of each group respectively, are connected to the other terminal of the secondary winding. All primary windings 25 of all the transformers, controlled by a timer 22, are connected across the mains 81, 82 of the AC source 27 which is applied to the circuit by closing the switch 83. The circuit of the electromagnetic clutch 56 and its control switch 58, is connected to the mains, and so is the circuit of the electromagnetic brake 57 and its control switch 60.

Figure 1:
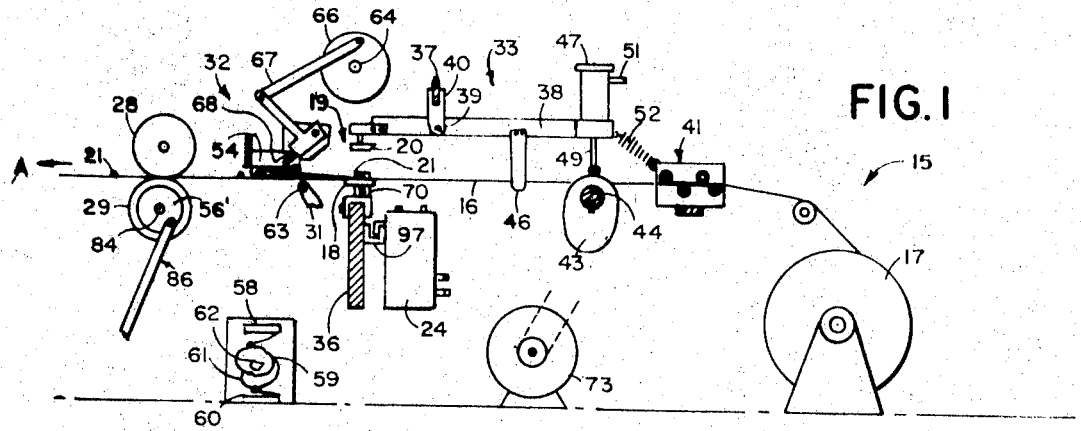
FIG. 1 is a fragmentary diagrammatic elevational view of an automatic machine for making wire mesh employing electric welding apparatus embodying teachings of this invention. Most of the framework and various other parts of the machine are omitted in order to attain clarity of illustration.
Figure 3:
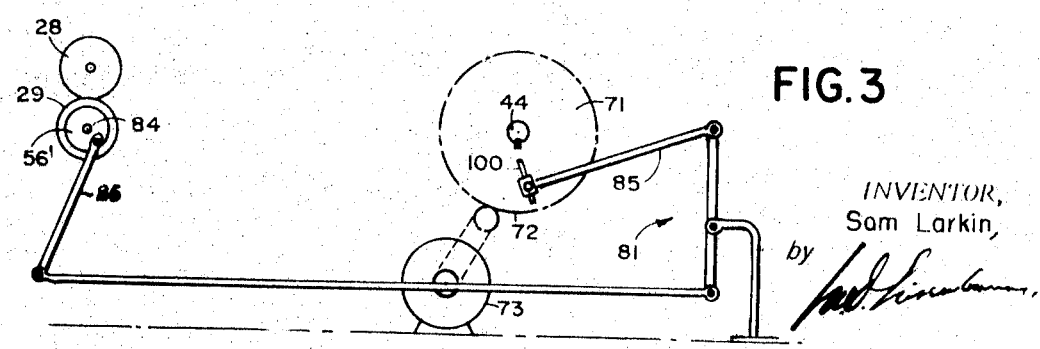
FIG. 3 is a fragmentary diagrammatic elevational view of the machine, showing only sufficient of the drive means to aid in explaining the operation of the machine.

A complete cycle of operation of the machine 15, is accomplished during every revolution of the cam shaft 44, as follows. At the commencement of a cycle, the condition of the machine is nearly that shown in the FIGS. 1 and 6, where a transverse wire 21 is in position across the longitudinal wires 16, at welding station 19, ready to be welded at their intersections. In each unit 33, the cam follower 50 is at its lowest position. The movable electrode 20 is at its highest position above the fixed electrode 18. The rollers 28, 29 are at rest because the unidirectional mechanical clutch 56' is being moved by the pitman 85 and associated linkage 86, in a direction where said rollers are disengaged from the shaft 84. The main switch 83 is in closed condition, so of course all the shafts 62, 63, 64, 44, and the shaft of the gear 72, are in constant uniform rotation, for the motor 73 is actuated. The electromagnetic brake 57 is in disengaged condition, because its controlling switch 60 is in open condition. The electromagnetic clutch 56 is in engaged condition, because its controlling switch 58 has just been closed. The temporary housing 54 is vacant. A supply of compressed air is constantly directed into the cylinder 47. The variance at the commencement of the cycle, with respect to the specific showing of the machine condition shown in FIG. 6, is that the main switch 83, and the cam-controlled switch 58, are closed.

The cycle of operation now commences. The device 30, feeds wire from the transverse wire supply 80, through the bushing 53, and thence into the housing 54, whereupon the clutch 56 is disengaged, and brake 57 is applied, whereupon the blade 31 will sever the fed length from the supply 80. While this is taking place, the cams 43 will cause the piston rods 49 to rise whereupon the bars 38 will be swung thereby bringing the upper electrodes 20 downward to contact and press the work against the fixed electrodes 18. Movement of said lever bars 38, will initiate action in the single timer 22 for the system, to commence the period of actuation of the primary windings of the transformers 24, whereupon welding commences. The timer actuation means is not shown, but well known in the art. After a prescribed interval, the timer will top functioning, and the current to the transformers will cut off, at which time the welding operation is completed. Now the levers 38 will be returned to their start position by action of the stressed springs 52, and the action of the pitman 85 and linkage 86, will cause the unidirectional clutch 56' to turn in a direction to drive the rollers 28, 29. This will cause the work to be advanced in the direction A, while the longitudinal wires 16 will be pulled, thereby feeding them from off their respective supply rolls 17, the required distance determining the spacing for the transverse wires. Now the transverse wire which is in the housing 54, is ejected therefrom by the shifter 68, which transports such wire to the welding station where it is stopped at proper position by the permanent magnets 69. Then said shifter returns to normal rest position. All this occurred during one revolution of the cam shaft 44, which marks the completion of the cycle of operation. Such cycle is then repeated again and again, until the wire stock is used up.

It is of importance to note that the pressure imposed on the work clamped by the electrodes in each unit 33, is of constant intensity as determined by the compressed air supplied into the cylinder 47, and that such pressure is applied in cushioned manner without any impact of a hammer blow, but "gentle" like in a press brake. Although in welding apparatus heretofore, the movable electrode was resiliently mounted by association with some sort of spring means, the pressure it exerted on the work increased continually during the work stroke. This marred uniformity in the structure of the joint effected, an objection entirely obviated by the present invention, as exemplified by the apparatus shown in FIG. 4.

To make a good weld, it is necessary to have a highly conductive path through the work clamped by the electrodes. Any wire stock having but a thin oxidation coat, becomes unsuitable for the welding process, and any thicker rust crust usually means that the stock cannot be used. To break such coat or crust, the stock first had to be subjected to some scraping operation. I find however that subjecting the wire at welding station to a relatively high pressure, crushes a thin coat or rust crust, so that the stock where so acted on, is sufficiently cleaned to attain proper conductivity. I therefore provide the system shown in FIG. 7, whereby at the commencement of clamping action on the work by the cooperating electrodes, the air supply introduced into the cylinders 47, is of relatively high pressure, which is soon stopped, and for the remainder of the cycle, an air supply of lower pressure is fed into said cylinders; such lower pressure being what is normal for proper welding.

The numeral 90 designates a valve device, which includes the solenoids 91 and 92; such valve directing a high pressure air supply H into the cylinders 47, when the solenoid 91 is actuated, and a low-pressure air supply L, when the solenoid 92 is actuated. The numeral 98 denotes a single pole, double throw switch, whose pole is controlled by a cam 43' carried on the shaft 44, in the manner of the cams 43, such cam being designed to close the circuit of the solenoid 91 at the start of a cycle and hold it closed a short period of time. Then for the remainder of the cycle, which is for the balance of the revolution of the shaft 44, said cam will shift the pole 93 to close the circuit of the solenoid 92; the electrical connections of this system being as follows: The pole 93 is spring-biased to normally be in contact with the cam 43' and the contact point 94 at the start of the cycle, and then to be moved by said cam to be in contact with the contact point 95 for the remainder of the one revolution of the shaft 44. The contact point 94, is connected to one terminal of the solenoid 91. The contact point 95, is connected to one terminal of the solenoid 92. The other terminals of the solenoids are connected by the conductors 96, 96' to one terminal of the current supply 27. The pole is connected to the other terminal of said current supply. The valve device 90 being well known in the machine art, no further description thereof is believed necessary.

If the mesh to be made shall have longitudinal wires of different diameters, as for instance, thicker wires along the outside and thinner wires as the intermediate ones, and in such instance the pressure to be applied to the thicker wires shall need be greater than the pressure to be applied to the thinner ones, then by providing a higher pressure air source for connection to the outer cylinders and a lower pressure air source for connection to the intermediate cylinders, the required result will be easily accomplished. Such arrangement and provision is believed readily understood without the necessity of further illustration.

To accommodate the machine to make wire mesh of different dimensions, the spacing of the units 33 across the machine, is made adjustable, and like provision is made for the wire straighteners 41 and the transformers 24. The cams 43 are adjustable in position on their common shaft 44 and secured by setscrews therealong thereto. The transformers are slidable along their suspension track 97. Holes as 98 and 99 are provided along the beams 36 and 37 for changing the positions of the stationary electrode mounts and the hangers 40, respectively. All this would be for altering the spacing of the longitudinal wires. To change the distance between transverse wires, adjustment would be made by changing the throw of the pitman 85, for which its connection to the wheel 71 is adjustable along the track slot 100.

This invention is capable of numerous forms and various applications without departing from the essential features herein disclosed. It is therefore intended and desired that the embodiments shown herein shall be deemed merely illustrative and not restrictive.

I claim:

1. In an electrical welding apparatus, a unit comprising in combination, a frame, a first welding electrode on the frame, a lever pivotally mounted away from one of its ends, on an axis on the frame, a second welding electrode on the lever, away from said axis and opposite the first electrode; said electrodes being in the same general plane so upon swinging movement of the lever, the second electrode will move towards and then away from the first electrode, means biasing the lever to a normal rest position whereat the second electrode is spaced from the first electrode, a means for applying a predetermined constant pressure on a workpiece when the workpiece is contacted by both electrodes, comprising a cylinder on the lever away from said axis; said cylinder having a piston slidably fitted therein, and a piston rod fixed to the piston and extending outwardly from the cylinder; said cylinder having a port for connection to a constant supply of a pressurized medium subjected to a predetermined pressure which medium when applied, will urge the piston in a direction so the piston rod will move in a direction out of the cylinder, and a drive means for actuating the lever to bring the second electrode to contact the workpiece, including a member movably mounted on the frame, to move the piston rod in a direction into the cylinder while said pressurized medium is applied, whereupon the pressure-applying means will follow said member prior to the engagement of the second electrode with the workpiece; said member of the drive means, after a predetermined movement thereof on the frame, allowing the biasing means to move the lever to bring the second electrode to its rest position away from the first electrode.

2. An electrical welding apparatus as defined in claim 1, wherein the lever is positioned along the horizontal, the cylinder is uprightly positioned, the piston rod extends downward from the piston, and the first electrode is below the second electrode.

3. An electrical welding apparatus as defined in claim 1, wherein said axis is intermediate the ends of the lever, and also intermediate the second electrode and the cylinder.

4. An electrical welding apparatus as defined in claim 1, wherein the member which is included in the drive means to move the piston rod is a cam, and including means to move the cam to move the piston rod.

5. An electrical welding apparatus as defined in claim 4, wherein the means to move the cam is a rotatable shaft carrying the cam; said cam being provided with an annular groove whose bottom wall is circular; said groove being substantially in the general plane of the electrodes of the unit.